H. WILSON & O. R. OEHMLER.
COMBINED RECORDING AND INDICATING APPARATUS.
APPLICATION FILED DEC. 26, 1908. RENEWED AUG. 13, 1910.

991,586.

Patented May 9, 1911.
5 SHEETS—SHEET 5.

WITNESSES:

INVENTORS
HARRY WILSON.
OSCAR R. OEHMLER.
BY
Attorney

UNITED STATES PATENT OFFICE.

HARRY WILSON, OF WASHINGTON, DISTRICT OF COLUMBIA, AND OSCAR R. OEHMLER, OF SEATTLE, WASHINGTON, ASSIGNORS OF ONE-THIRD TO EDWARD A. HENKLE, OF PHILADELPHIA, PENNSYLVANIA.

COMBINED RECORDING AND INDICATING APPARATUS.

991,586.          Specification of Letters Patent.      Patented May 9, 1911.

Application filed December 26, 1908, Serial No. 469,314. Renewed August 13, 1910. Serial No. 577,088.

*To all whom it may concern:*

Be it known that we, (1) HARRY WILSON and (2) OSCAR R. OEHMLER, citizens of the United States, residing at (1) Washington, District of Columbia, and (2) Seattle, county of King, State of Washington, have invented certain new and useful Improvements in Combined Recording and Indicating Apparatus, of which the following is a specification, reference being had therein to the accompanying drawing.

This invention relates to a combined recording and indicating apparatus designed primarily for use in connection with marine vessels, but it is to be understood that the apparatus is adapted for any purposes wherein it is found applicable.

The primary object of the invention is to provide an apparatus of such class with means operated from the engine of a vessel whereby a record will be made of the manner in which the engine has been operated in response to an order to an engineer or if the engine is operated by the engineer without orders, the time of the response and the duration of time when the order was carried out; and with means to visibly indicate in what direction an engine is operating as well as the speed of the engine to an engineer, as well as to a navigating or other officer of a vessel.

A further object of the invention is to provide an apparatus of the class referred to with means operated from the engine of a vessel whereby the manner in which the engine is operating, *i. e.*, ahead or astern, as well as the speed of the engine can be ascertained from a plurality of indicating devices operating simultaneously and disposed at various points throughout the vessel, by way of example, an indicating device can be located in the engine room, pilot house, on the bridge, and on the port and starboard sides of a vessel.

A further object of the invention is to provide an apparatus of the class referred to with means in a manner as hereinafter set forth whereby the direction of operation of the engine as well as its speed will be visibly and automatically indicated simultaneously to the navigating officer and engineer of a vessel simultaneous with such visible indications making a permanent record of the action of the engine.

With the foregoing and other objects in view the invention consists of the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In the drawings. Fig. 3 is a diagram showing the circuits in connection with the form shown in Fig. 2.

Figure 1:
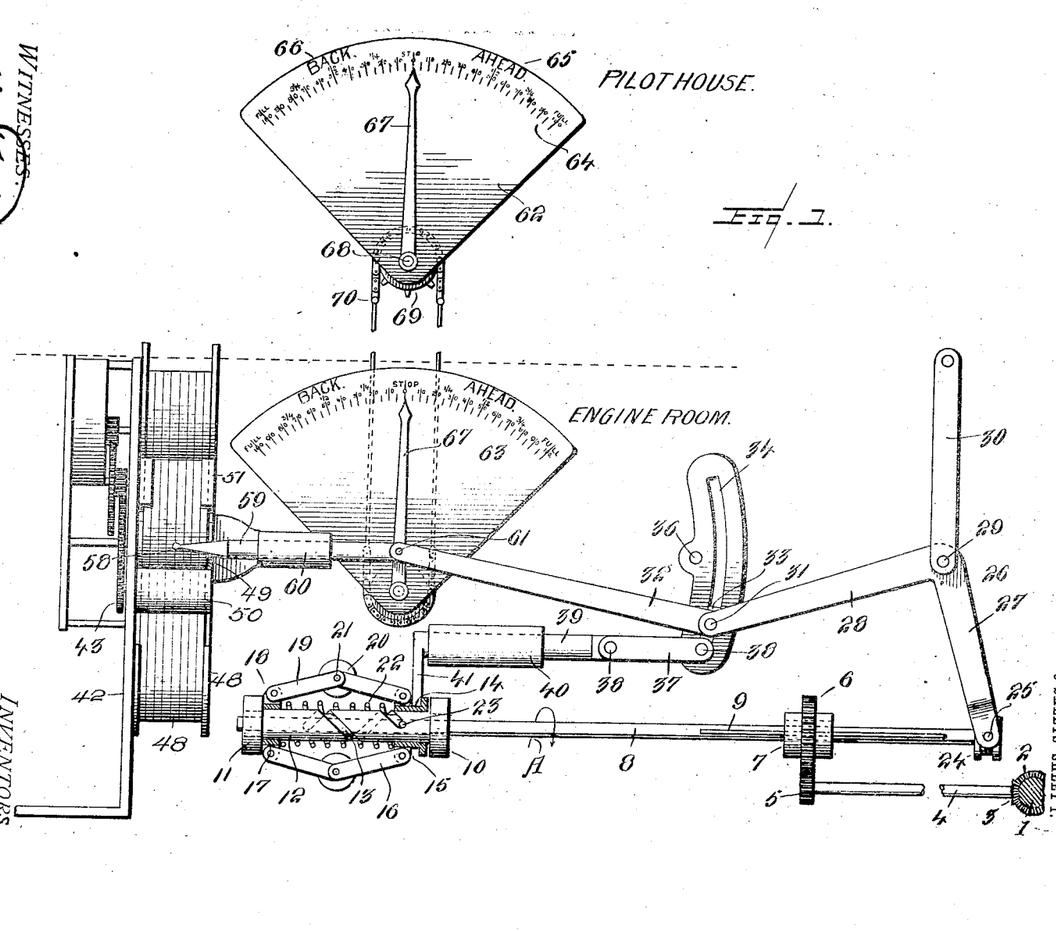
Figure 1 is a diagrammatical view of one form of a combined recording and indicating apparatus in accordance with this invention.

Referring to Fig. 1 of the drawings, 1 denotes the engine or propeller shaft or a counter shaft driven from the engine or propeller shaft and provided with beveled gear 2 meshing with a beveled pinion 3 carried on one end of a counter shaft 4. Upon the other end of the counter shaft 4 is secured a pinion 5 which meshes with a gear 6 carried by sleeve 7. Extending through the sleeve 7 is a rotatable and longitudinally shiftable spindle 8 provided with a feather 9 engaging in the inner face of the sleeve 7. The feather 9 permits the spindle 8 being longitudinally shifted and causes it to rotate with the sleeve 7. The spindle 8 has secured thereto a pair of collars 10 and 11 and surrounding the spindle 8 between the collars 10 and 11 is an elongated sleeve 12 formed with a helical groove 13. The sleeve 12 is loose on the shaft and has mounted thereon in proximity to the collar 10 a flanged annular member 14 provided with apertured lugs 15 to which is pivoted links 16. Upon the sleeve 12 in proximity to the collar 11 is mounted a band 17 having apertured lugs 18 to which are pivoted the links 19. These latter and the links 16 are pivotally secured together and to the weights or balls 20 as at 21. Interposed between the member 14 and the band 17 is coil spring 22 which surrounds the sleeve 12. The spindle 8 carries a pin 23 which travels in the groove 13 whereby on the rotation of the spindle 8 the governor mechanism consisting of the elements 14 to 21 are operated. Carried by the spindle 8 is a grooved collar 24 in which extends a pin 25 projecting from the lower arm of a bell crank lever 26, said arm being indicated by the reference character 27 while the upper arm of the bell crank lever 26 is indicated by the reference character 28. The lever 26 is pivoted as at 29 to a hanger 30. The arm 28 of the bell crank lever 26 is pivotally connected by the pin 31 to a link 32 and to a sliding block 33 shiftably mounted within a curved slot 34 formed in a curved link 35 pivoted intermediate its ends as at 36. The reference character 37 denotes a link carrying a pin 38 which is attached to the lower portion of the slot 34 of the link 35. The link 37 is pivotally attached as at 38 to an angle-shaped shifting member, the horizontal arm 39 thereof being pivoted to the link 37 and extending through the guide 40 while the vertical arm 41 of said shifting member extends between the flange of the member 14 and one of the lugs 15. The foregoing construction constitutes an operating means actuated from the engine for operating the recording device as well as the indicating mechanism and is used in connection with either of the indicating mechanisms shown, that is to say, the indicating mechanism shown in Fig. 1, as well as that shown in Fig. 2 and Fig. 3. The operation of this operating mechanism will be hereinafter referred to in connection with the separate forms of the indicating mechanisms as well as the recording device.

As the same recording device is used in connection with any of the forms of the indicating mechanisms shown, it is only illustrated in connection with the form of indicator shown in Figs. 1 and 2, but it is applicable to the form of indicator shown in Fig. 3, and it will now be described.

Referring to Figs. 1, 3, 6 and 7, in which is shown the recording device, or elements thereof, 42 denotes a supporting plate carrying a clock train 43 for operating the spindles 44 and 45 for unwinding the record tape 46 from the reel 47. A receiving spool is indicated by the reference character 48 and which is driven from the clock train 43 and upon which is wound the tape as it leaves the rolls 49 and 50. The guide for the record tape is indicated by the reference character 51. The record tape 46 is formed with a series of longitudinally and transverse lines 52 and 53 whereby vertical columns of spaces and longitudinally extending rows of spaces are provided. By way of example, each space indicates a minute and centrally of the tape a divisional line as at 54 is provided to indicate stop. The tape is adapted to have recorded thereon the number of revolutions of the engine shaft whether the engine is running ahead or back, the tape being divided into two sections by the line 54, one section to indicate "ahead" as at 55 and the other "back" as at 56. The section 55 is divided to indicate a quarter speed, one-half speed ahead, three-quarters speed ahead, and full speed ahead, the section 56 being also divided to indicate one-quarter speed back, one-half speed back, three-quarters speed back, and full speed back. The inner longitudinal row of spaces of each section is designed to indicate ten revolutions of the engine shaft, the indications increasing outwardly, for example, the inner row would indicate 10 revolutions and adjacent row 20 and so on, the maximum speed being, by way of example, one hundred. The indications for both sections ahead and back are designated by reference character 57. By the foregoing arrangement a record can be made upon the tape of the exact number of revolutions the engine shaft is making, whether the engine is running ahead or back, or whether the engine is at stop and the duration of time the engine remains at stop or travels ahead or back. Associating with the tape 46 is a marker 58 which operates transversely of the tape to be positioned so as to inscribe upon the tape a record in the form of a longitudinal line at a point between the longitudinal lines 53 upon the tape, or upon the line 54. The marker 58 is carried by a reciprocatory arm 59, the latter slides through a guide 60 and is pivotally connected by the pin 61 to one end of the link 32. The tape 46 through the medium of the clock train 43 travels at a predetermined rate of speed and even though the engine is at stop the marker 58 will record upon the tape the duration of the stoppage.

The manner in which the arm 59 is operated so as to inscribe upon the tape a record of the action of the engine is as follows: The sliding spindle 8 being driven from the shaft 1, the governor is operated through the medium of the pin 23 in the direction of the arrow A, when the balls or weights 20 are thrown outward by the contracting links 16 and 19, the member 14 is shifted toward the band 17 or in other words slides to the left carrying the shifting member therewith, such action of the shifting member rocks the link 35 on its pivot 36, the link 35 shifting the link 32 which moves the arm 59 toward the inner longitudinal edge of the tape carrying the marker therewith, the marker being shifted to one of the longitudinal rows of a section of the tape which indicates "back" and on which a record is made. When the engine reverses the sliding spindle 8 will not shift the governor until the pin 23 moves through and to the left end of the groove 13, and by this time the sliding spindle 8 will have moved from arrow Y to arrow X actuating the bell crank 26 and shifting the pivot 31 to the upper end of the slot 34 in the link 35 so that when the flanged member 14 is caused to again move to the left by the operation of the governor, the marker 58 will be shifted by the arm 59 to the "ahead" section of the tape, making the necessary record thereon in one of the rows of spaces of said section.

Referring to the indicating means shown in Fig. 1 it embodies a primary and a secondary indicating mechanism, each formed of an indicating plate, the plate for the primary being indicated by the reference character 63 and the plate for the secondary by the reference character 62, the plates 62 and 63 are provided with corresponding indications 64 divided into two divisions, one "ahead" as at 65 and the other "back" as at 66, these indications designating the speed of the engine shaft or other desired matter. The plate 62 is arranged in the pilot house, and the plate 63 in the engine house, and associating with the indications upon each plate is a pointer 67 mounted upon a shaft 68 carrying a ratchet wheel 69. The ratchet wheels 69 are connected together by a belt 70 or other suitable means whereby on the movement of the lower one of the shafts 68 motion will be transmitted to the upper one of the shafts and the pointer carried by this latter shaft will be shifted. The pointer 67 for the plate 63 is connected by the pin 61 to the arm 59 and lever 32 so that when the operating mechanism for the recording device is actuated, such operating mechanism also constituting the operating mechanism for the indicating mechanism, the dial 67 of the plate 63 is shifted to indicate ahead or back as the case may be, as well as indicating the number of revolutions of the engine shaft. When the said pointer 67 of the plate 63 is shifted the shaft 68 to which said pointer is attached is rocked and which through the medium of the transmission 70 will actuate the shaft 68 for the pointer 67 of the plate 62 so that it will be indicated in the pilot house in what direction the engine is running and also the speed of the engine. The same indication will be had in the engine room as will be evident.

Figures 1, 2:
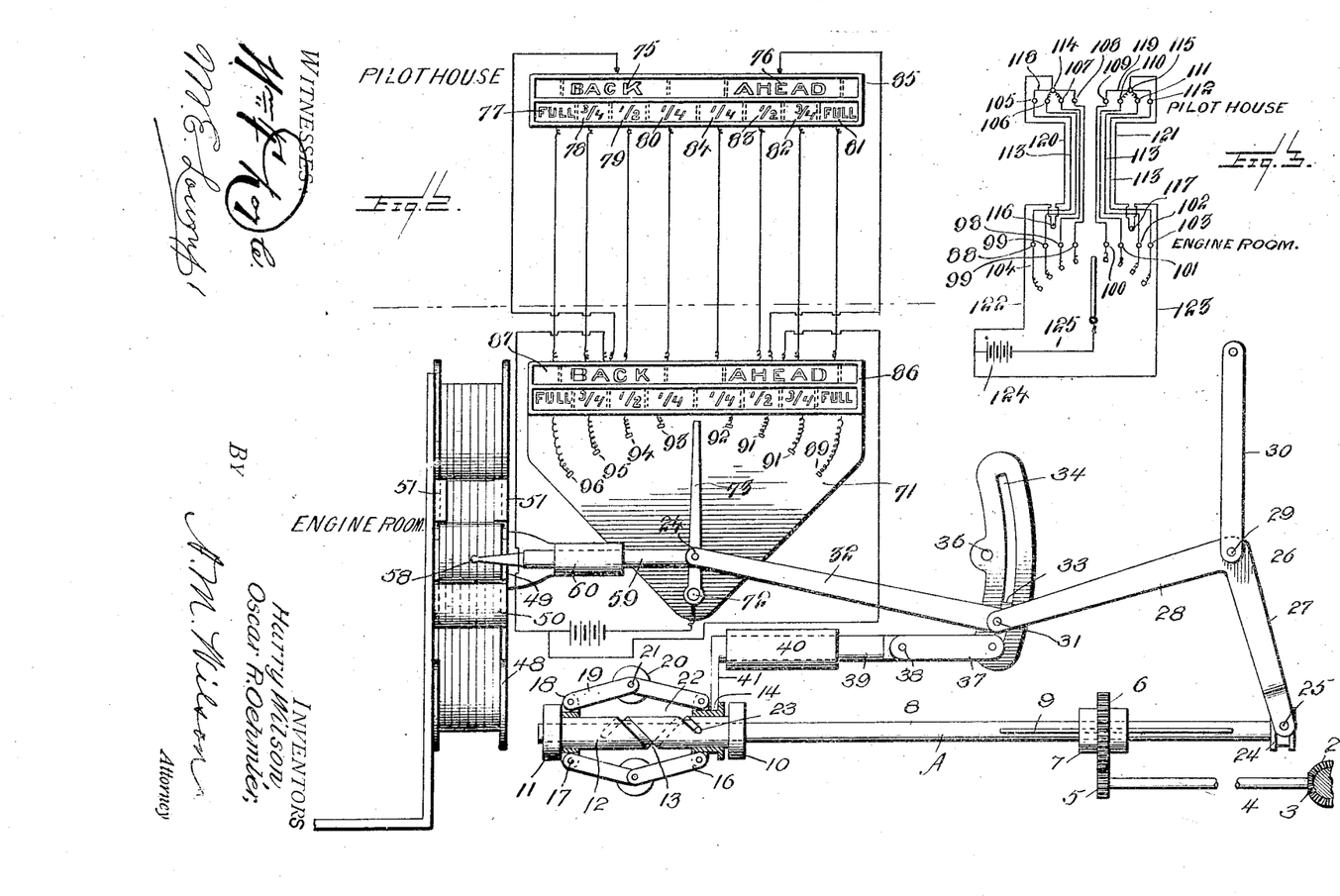
Fig. 2 is a diagrammatical view illustrating a modified form of a recording and indicating mechanism in accordance with this invention.

In a combined recorder and indicator in accordance with this invention the indicator may be a mechanical one or as shown in Figs. 2 and 3 an electrical one, the description of the electrical indicator shown in Figs. 2 and 3 will now be described. Such construction of indicator can be used in lieu of the form shown in Fig. 1.

Referring to Figs. 2 and 3 of the drawing 71 indicates a supporting plate which is arranged in the engine room and has pivoted thereto as at 72 a pointer 73 to which is pivotally-connected as at 74 the arm 59 and link 32. By such an arrangement it is evident that when the link 32 and arm 59 is actuated, the pointer 73 will be shifted, the shifting of the pointer is for the purpose of closing an electrical circuit to cause corresponding visible indications, so that the engineer as well as the navigating officer can ascertain in what direction the engine is running and at what speed, or to visibly indicate any other corresponding indications desired. By way of example, the indications shown are to indicate "back" as at 75 which means that the engine is running backward, "ahead" as at 76 meaning that the engine is running ahead. Associating with the indication "back" are the following indications: "full" as at 77; "three-quarters" as at 78; "one-half" as at 79; and "one-quarter" as at 80. The indications 77 to 80 mean full speed back, three-quarters speed back, one-half speed back, and one-quarter speed back. Associating with the indication "ahead" are the following indications: "full" as at 81; "three-quarters" as at 82; "one-half" as at 83; and "one-quarter" as at 84; and which means full speed ahead, three-quarters speed ahead, one-half speed ahead, and one-quarter speed ahead. Duplex indications 75 to 84 are employed, one set as at 85 in the pilot house, and the other set as at 86 in the engine room. The indicating means located in the engine room is termed the primary indicating mechanism and the indicating means located in the pilot house is termed the secondary mechanism. Each of said indications are carried by a translucent or opaque element 87 with the indications so arranged thereon as to be transparent, so that when a lamp is illuminated at the back of the translucent elements the indications will be visible. For each indication there is a lamp. The circuits in connection with the lamps will now be referred to. The plate is provided with the contacts 89, 90, 91, 92, 93, 94, 95, and 96. The contacts 89 to 96 respectively are connected to the lamps 88, 97, 98, 99, 100, 101, 102, and 103 by a short wire 104. The lamps 89 and 99 to 103 are arranged at the rear of the indications 77 to 82 respectively in the engine room. The lamps 88 and 99 to 103 are connected to the lamps 105, 106, 107, 108, 109, 110, 111, and 112 by the branch wires 113. The lamps 105 to 112 are arranged at the rear of the indications 77 to 84 which are in the pilot house. At the rear of the indications 75 and 76 which are in the pilot house are arranged lamps 114 and 115, and at the rear of the indications 75 and 76 within the engine room are arranged the lamps 116 and 117. The lamps 105 to 108 are connected to the lamp 114 by the branch wires 118 and the lamps 109 to 112 are connected to the lamp 115 by the branch wires 119. The lamp 114 is connected to the lamp 116 by the branch wire 120 and the lamp 115 is connected to the lamp 117 by the branch wire 121. From the lamps 116 and 117 lead the circuit wires 122 and 123 respectively, which are connected to the source of electrical energy 124. From the source of electrical energy 124 leads the branch wire 125 which is connected to the pointer 73. If the pointer 73 be shifted to engage the contact 92 the lamps 100, 109, 115, and 117 will be illuminated whereby the indication one-quarter speed ahead will be visible, the indication not only being visible in the engine room, but also in the pilot house, and also remains visible until the pointer 73 is shifted from engagement with the contact 92. When the pointer 73 is in engagement with the contact 92, the circuit will be from electrical source 124, wire 125, pointer 73, contact 92, through the lamp 100, branch wire connecting lamp 100 and lamp 109, branch wire 119 connecting lamp 109 with lamp 115, branch wire 121 connecting lamp 115 with lamp 117, and from lamp 117 by branch wire 123 to electrical source 124. The lamps 115 and 117 will always be illuminated when the pointer 73 engages with any of the contacts 89 to 92 as will be evident, and the lamps 114 and 116 will always be illuminated when the pointer 73 engages any of the contacts 93 to 96. It is thought unnecessary to describe each circuit as the various circuits can readily be understood from the description of the circuit referred to. When the circuit is closed to visibly indicate the direction in which the engine is running and the speed of the engine, the arm 59 is also shifted so that the record is made upon the tape 46, the record being made simultaneously with the operating of the indicating mechanism.

Figure 4:
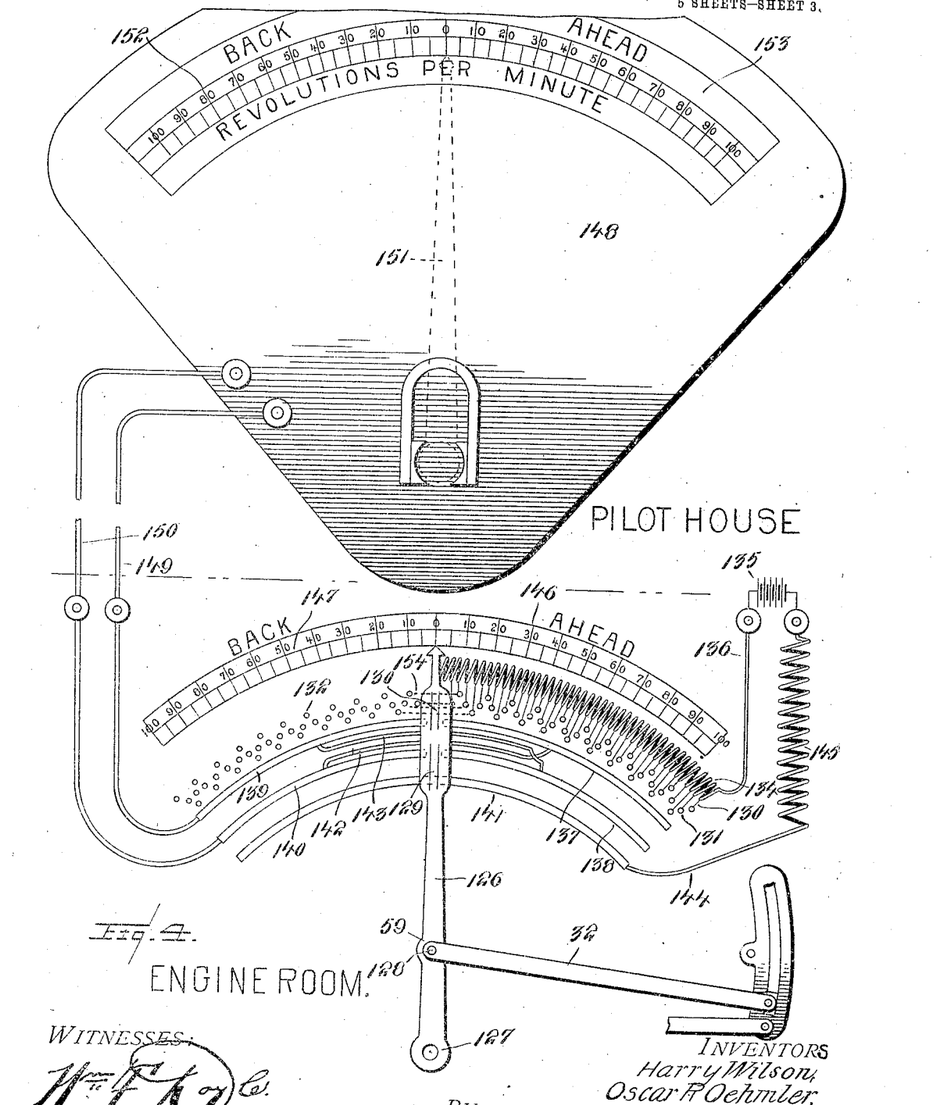
Fig. 4 is a diagrammatical view illustrating a modified form of indicating mechanism.

The modified form of indicating mechanism shown in Fig. 4 comprises a pointer 126 pivoted as at 127 and to which is also pivotally connected as at 128 the arm 59 and link 32. The pointer 126 is provided with a pair of contacts 129 and 130, the former adapted to engage the contact points of the set 131 or of the set 132, each of the contacts of the set 131 being connected by a branch wire 133 to the resistance 134 which is connected to the electrical source 135 by the branch wire 136. Arranged in operative relation with respect to the pointer 136 are the contact strips 137, 138, 139, 140, and 141. The contact strip 137 is connected to the strip 140 by the bridge 142, and the contact strip 138 is connected to the contact strip 139 by the bridge 143. The contact strip 141 is connected by the branch wire 143 and 144 to a resistance 145 which is connected with the electrical source 135. The set of contacts 131 associates with the scale 146 for indicating that the engine is traveling "ahead" as well as the revolutions of the engine shaft. The set of contacts 132 associates with the scale 147 for indicating that the engine is running "backwardly", as well as the revolutions of the engine shaft. The scales 146 and 147 are arranged in the engine room and within the pilot house is positioned a miliammeter 148 provided with scales corresponding to the scales 146 and 147. The electrical wire connections between the contact strips 139 and 140 and the miliammeter are indicated by the reference characters 149 and 150. The pointer 151 of the miliammeter associates with the scales 152 and 153 of the said meter, such scales as before stated corresponding to scales 147 and 146. Each contact point of the set 131 associates with a graduation of the scale 146 and a like arrangement is had in connection with the set of contacts 132 with respect to the graduation of the scale 147. The electrical circuit for "ahead" is as follows: It will be assumed that the pointer 126 has been shifted to engage one of the contacts of the set 131, the circuit would then be from the battery 135, wire 136, contact point 131, contact 130, contact strip 137, bridge 142, contact strip 140, wire 150, to miliammeter 148, through the meter, back over wire 149, contact strip 139, bridge 143, contact strip 138, contact 129, contact strip, 140, wire 144, resistance 145, to battery 135.

The set of contacts 132 are cross-connected with the contact points of the set 131 in the manner as indicated by dotted lines 154 in Fig. 4. This same arrangement is carried throughout with respect to the contact points of the set 132. The backcircuit is as follows: It will be assumed that the pointer 126 has been shifted to engage one of the points of the set 132, the circuit is battery 135, wire 136, resistance 134, one of the cross wires 154, contact point of the set 132, contact 130, contact strip 139, wire 149, the miliammeter 148, through the latter, back over wire 150, contact strip 140, contact 129, contact strip 141, wire 144, resistance 145, to battery 135.

In the form shown in Fig. 4 when the pointer 126 is shifted to engage that contact of the set 131 which associates with the indication 20 for ahead, the circuit will be closed so that the pointer 151 will be shifted to make the same indication. Under such conditions the engineer will note that the engine shaft is making twenty revolutions and that the engine is running ahead, and such information will also be furnished to the navigating officer owing to the operation of the miliammeter. If the pointer 126 should be shifted to engage one of the contact points of the set 132, say that contact pin is at the indication 60, the engineer will be informed that the engine is running backwardly and that the engine shaft is revolving sixty revolutions. As such operation on the part of the pointer 126 will close the circuit, the miliammeter will be operated and the navigating officer upon inspection of the miliammeter can also ascertain the action of the engine as well as the speed. When the device shown in Fig. 4 is operated, to indicate ahead or back, as well as the speed of the engine, the recording device is simultaneously operated as the arm 59 is shifted with the pointer 126.

Figure 5:
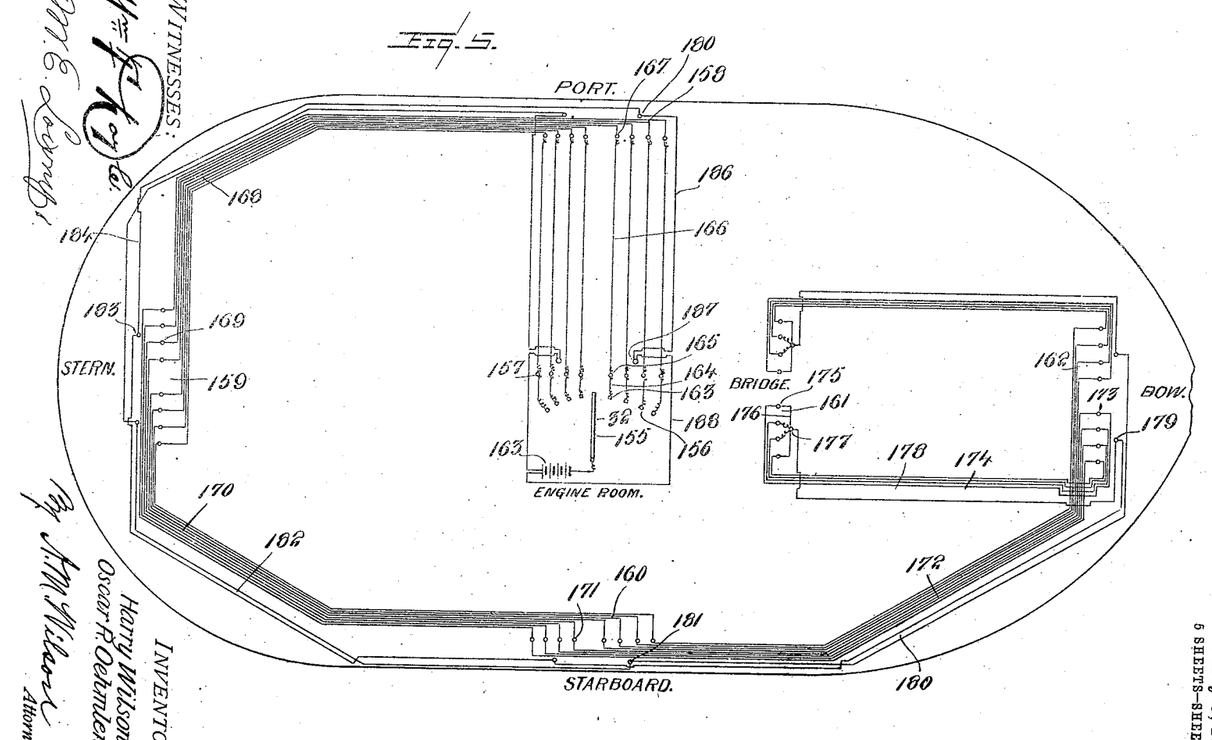
Fig. 5 is a diagrammatical view illustrating the arrangement of a plurality of indicating mechanisms with respect to a vessel.
Figures 6, 7:
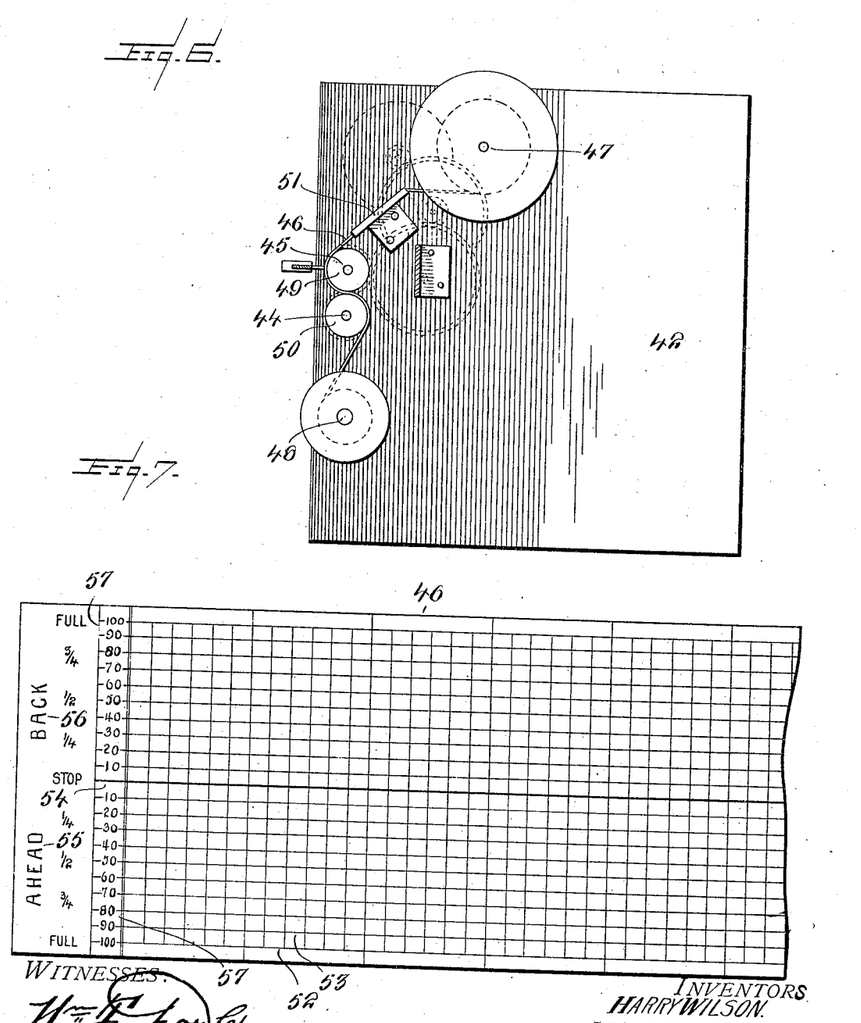
Fig. 6 is a detail view showing the tape-shifting device.
Fig. 7 is a front view broken away of the tape.

In Fig. 5 of the drawings, a vessel is shown diagrammatically as provided with a series of indicating mechanisms whereby they will all be simultaneously operated when the pointer 155 is shifted to engage a contact 156. The form of indicating mechanisms employed is similar to that shown in Fig. 2. The circuit connections being such as to cause a simultaneous operation of the indicators. The indicators are arranged in the engine room, at the port side of the vessel, at the stern, at the starboard side, on the bridge, and in the pilot house, and are indicated respectively by the reference characters 157, 158, 159, 160, 161, and 162. The source of electrical energy is indicated by reference character 163. It is thought unnecessary to trace all of the circuits in connection with the various lamps for the various indications as it is thought that the circuits can be fairly understood when but one circuit is traced. It will be assumed that the pointer 155 has been shifted to engage a contact 163, the circuit will be battery 153, pointer 155, contact 163, branch wire 164, lamp 165, branch wire 166, lamp 167, branch wire 168, lamp 169, branch wire 170, lamp 171, branch wire 172, lamp 173, branch wire 174, lamp 175, branch wire 176, lamp 177, branch wire 178, lamp 179, branch wire 180, lamp 181, branch 182, lamp 183, branch wire 184, lamp 185, branch wire 186, lamp 187, branch wire 188, battery 163. This will not only illuminate the lamps at the back of the corresponding indications for indicating full speed ahead or otherwise, but will also illuminate the lamps at the rear of the inscription ahead or back as the case may be. When the circuit is closed the recording device is also thrown into operation through the medium of the link 32 and arm 59. With the foregoing arrangement an officer can ascertain at various points upon the vessel what the engine is doing.

The combined recorder and indicator not only acts as a check upon the engineer but also the navigating officer in case he should give a wrong order. In this connection it will be assumed that the navigating officer telegraphed to the engineer through the medium of the ordinary ship's telegraph full speed ahead. The engineer responds promptly and correctly, the navigating officer by referring to the indicating mechanism can ascertain whether the engineer has correctly carried out the orders, if not the indicating mechanism would show it.

From the foregoing construction and arrangement of parts, it is evident that a means is set up whereby a navigating officer as well as the engineer can ascertain what the engine is doing and that furthermore a permanent record is made of the actions of the engine and which can be used in case of a dispute. This permanent record being made by a recording device actuated from a moving part of an engine. The actuating mechanism for the recording device as well as for the indicating mechanism being common to both and is operated as afore stated,—from a moving part of the engine, and not manually.

What I claim is:

1. A combined recording and indicating apparatus comprising a primary and a secondary engine operated indicator mechanism positioned at different points for visibly indicating simultaneously to the navigating officer and to the engineer the action of an engine, means associating with said mechanisms for causing corresponding indications by the said mechanisms when the said primary is operated, a recording mechanism for permanently recording the action of a rotatable element, said recording mechanism connected to said primary, an operating mechanism for and common to said primary and said recording mechanism for simultaneously shifting said primary from one indicating position to another and said recording mechanism from one recording position to another, a positioning means for said operating mechanism, a rotatable and longitudinally shiftable means driven from the engine for governing said positioning means, and a controlling mechanism for said governing means and said operating mechanism.

2. A combined recording and indicating apparatus comprising a primary and a secondary engine operated indicator mechanism positioned at different points for visibly indicating simultaneously to the navigating officer and to the engineer the action of an engine, means associating with said mechanisms for causing corresponding indications by the said mechanisms when the said primary is operated, a recording mechanism for permanently recording the action of a rotatable element, said recording mechanism connected to said primary, an operating mechanism for and common to said primary and said recording mechanism for simultaneously shifting said primary from one indicating position to another and said recording mechanism from one recording position to another, a rotatable and longitudinally shiftable means driven from the engine after positioning and governing the position of said operating mechanism, and a controlling mechanism for said means and said operating mechanism.

3. A combined recording and indicating apparatus comprising a primary and a secondary indicator mechanism positioned at different points for visibly indicating the action of an engine, means associating with said mechanisms for causing corresponding indications by the said mechanisms when the said primary is operated, a recording mechanism for permanently recording the action of a rotatable element, said recording mechanism connected to said primary, an operating link for and common to said primary and said recording mechanism for simultaneously shifting said primary from one indicating position to another and said recording mechanism from one recording position to another, said link connected to said primary and capable of being reciprocated, a positioning mechanism for said link, a governing mechanism for said positioning mechanism, and a controlling mechanism for said governing mechanism, said controlling mechanism operatively connected with the positioning mechanism for operating the link after the latter has been positioned.

4. A combined recording and indicating apparatus comprising a primary and a secondary indicator mechanism positioned at different points for visibly indicating the action of an engine, means associating with said mechanisms for causing corresponding indications by the said mechanisms when the said primary is operated, a recording mechanism for permanently recording the action of a rotatable element, said recording mechanism connected to said primary, an operating link for and common to said primary and said recording mechanism for simultaneously shifting said primary from one indicating position to another and said recording mechanism from one recording position to another, said link connected to said primary and capable of being reciprocated, means for controlling the position of the link with respect to said primary and recording mechanism, a rotatable and longitudinally shiftable element for governing the said controlling means, and means operatively connected with said element and with said controlling means for reciprocating said link.

5. A combined recording and indicating apparatus comprising a primary and a secondary indicator mechanism positioned at different points for visibly indicating the action of an engine, means associating with said mechanisms for causing corresponding indications by the said mechanisms when the said primary is operated, a recording mechanism for permanently recording the action of a rotatable element, said recording mechanism connected to said primary, an operating link for and common to said primary and said recording mechanism for simultaneously shifting said primary from one indicating position to another and said recording mechanism from one recording position to another when responding to an order, said link connected to said primary and capable of being reciprocated, a rotatable and longitudinal shiftable controlling means for said link, and means for governing the operation of the controlling means.

6. A combined recording and indicating apparatus comprising a primary and a secondary indicating mechanism positioned at different points for visibly indicating the action of an engine, means associating with said mechanisms for causing corresponding indications by the said mechanisms when the said primary is operated, a recording mechanism for permanently recording the action of a rotatable element, said recording mechanism connected with said primary, a shiftable link connected to the primary and adapted when operated to simultaneously shift said primary from one indicating position to another and said recording mechanism from one recording position to another, a slotted link pivotally mounted intermediate its ends, a block slidable in the slot of the pivoted link, a bell crank lever, means for pivotally connecting the shiftable link and bell crank to said block, means for actuating the bell crank to position said shiftable link, and means for rocking the pivoted link whereby the shiftable link will be operated.

7. A combined recording and indicating apparatus comprising a primary and a secondary indicating mechanism positioned at different points for visibly indicating the action of an engine, means associating with said mechanisms for causing corresponding indications by the said mechanisms when the said primary is operated, a recording mechanism for permanently recording the action of a rotatable element, said recording mechanism connected with said primary, a shiftable link connected to the primary and adapted when operated to simultaneously shift said primary from one indicating position to another and said recording mechanism from one recording position to another, a slotted link pivotally mounted intermediate its ends, a block slidable in the slot of the pivoted link, a bell crank lever, means for pivotally connecting the shiftable link and bell crank to said block, means for actuating the bell crank to position said shiftable link, means for rocking the pivoted link whereby the shiftable link will be operated, and a controlling mechanism for governing the operation of the means for rocking the pivoted link and means for actuating the bell crank.

In testimony whereof, we affix our signatures in the presence of two witnesses.

HARRY WILSON.
OSCAR R. OEHMLER.

Witnesses for Harry Wilson:
A. M. WILSON,
E. P. CORBETT.

Witnesses for Oscar R. Oehmler:
PIERRE BARNES,
WM. GROGG.